United States Patent [19]

Kühnel

[11] Patent Number: 4,633,491
[45] Date of Patent: Dec. 30, 1986

[54] CIRCUIT FOR ELECTROTHERMAL LEVEL MEASUREMENT COMPENSATED FOR AMBIENT TEMPERATURE

[75] Inventor: Frank Kühnel, Eschborn, Fed. Rep. of Germany

[73] Assignee: VDO Adolf Schindling AG, Frankfurt am Main, Fed. Rep. of Germany

[21] Appl. No.: 710,168

[22] Filed: Mar. 11, 1985

[30] Foreign Application Priority Data

Mar. 10, 1984 [DE] Fed. Rep. of Germany ....... 3408824

[51] Int. Cl.[4] .............................................. G01F 23/24
[52] U.S. Cl. ........................................ 377/20; 377/25; 73/295; 340/620
[58] Field of Search ...................... 377/20, 25; 73/295; 340/620

[56] References Cited

U.S. PATENT DOCUMENTS

| | | | |
|---|---|---|---|
| 4,053,874 | 10/1977 | Glaser | 73/295 |
| 4,079,315 | 3/1978 | Mohr | 377/20 |
| 4,163,391 | 8/1979 | Bezard et al. | 73/295 |
| 4,397,031 | 8/1983 | Weber | 377/20 |
| 4,558,456 | 12/1985 | Bezard et al. | 377/25 |

Primary Examiner—John S. Heyman
Attorney, Agent, or Firm—Martin A. Farber

[57] ABSTRACT

In a circuit for electrothermal measurement of level compensated for ambient temperature which has a switched source of constant current (2) for a resistance probe (1), a first variable formed from an initial voltage $U_0$ on the resistance probe at the start of a heating period is compared by a comparator (14) with a second variable formed from a heating voltage $U_1$ at the end of a heating period. One of these two variables, in this case the first variable, is formed in accordance with a time integral and used as basis for the comparison with the other variable. For the formation of the integral, a resistor (10) and a capacitor (9) are components of an integrator whose input can be coupled to the resistance probe (1) via a first sample and hold member (4, 5) for the initial voltage $U_0$. The output of the integrator is connected to a first input (13) of a comparator (14). The second input (15) of the comparator can be connected via a second sample and hold member (6, 7) directly to a resistance probe (1), i.e. not via an inverter for the heating voltage $U_1$. A presettable backward counter (17) is connected to the output of the comparator in order to determine the time between the actuation of the second sample and hold member and the switching of the comparator.

9 Claims, 9 Drawing Figures

CIRCUIT FOR ELECTROTHERMAL LEVEL MEASUREMENT COMPENSATED FOR AMBIENT TEMPERATURE

BACKGROUND OF THE INVENTION

The invention concerns a circuit for electrothermal measurement of level compensated for ambient temperature, which has a switched source of constant current for a resistance probe, a comparator which compares a first variable formed from an initial voltage $U_0$ at the resistance probe at the start of a heating period with a second variable formed from a heating voltage $U_1$ at the end of a heating period, the formation of at least one of the two variables taking place in accordance with a time function determined by a capacitor and a resistor.

In one such known circuit, the resistance probe is connected upon the start of each measurement (beginning of a measurement period) to the source of constant current which is actuated during the heating period by a program control (delay circuit). The latter is connected to the comparator. The comparator is connected, on the one hand, with an inverter which is connected to the resistance probe and to a resistor-capacitor member connected in parallel thereto, in such a manner that the comparator gives off an output signal to a monitoring device as soon as the voltage drop over the resistor-capacitor member is equal to that of the inverter (Federal Republic of Germany OS No. 27 40 289). The principle of measurement is based on the measurement of the change in resistance, obtained at the end of a period of heating by a constant current, of the resistance probe which is surrounded to a greater or lesser extent by the fluid to be measured. Ordinarily, the difference between the voltage $U_1$ at the end of the heating period and an initial voltage $U_0$ at the beginning thereof is determined. In order for the result of this measurement to be independent of the ambient temperature, the following measures are taken in said prior art: At the time of the connection of the resistance probe, the inverter supplies a voltage $V-U_0$ which charges the capacitor of the resistor-capacitor member. The latter then discharges in accordance with a known law which is determined by the resistance and the capacitance. When, during the further course of the heating period, the resistance probe heats up, the voltage U increases and the inverter supplies a voltage of the form $V-U$ which is dependent on the depth of immersion of the resistance probe. The time at which the voltage curve of the capacitor (charge curve), which can be represented as a straight line, intersects the curve of the inverted voltage $V-U$ is noted by the comparator. At a time determined by the program control the comparator is controlled in such a manner that a comparison is effected between the value of the inverted voltage $V-U_0$ at the terminals of the resistor-capacitor member and the value of the voltage present on the inverter. A conitoring device connected to the output of the comparator can, in this connection, give off an alarm when a predeterminable threshold value has been exceeded. In general, according to this prior art, the level of a liquid into which the resistance probe is immersed can also be indicated by digital or analog indicating instruments. This circuit is relatively expensive, in particular because of the inverter which is present. In addition, it cannot be seen how this circuit can be integrated in an analog to digital converter in order to form digital display values.

A circuit similar to this type for the electrothermal measurement of level has also been proposed which has a resistance probe which is heated by a constant current and an evaluation circuit which evaluates a measurement voltage which is dependent on the state of immersion of the resistance probe, into which circuit a combination voltage can furthermore be fed for the temperature compensation, and in which the compensation voltage can be obtained from the resistance probe and stored at the start of the heating period while at the end of the heating period the measurement voltage can be obtained (Patent Application No. DE P 33 37 779.0). For the temperature compensation, the evaluation circuit is adapted to form the quotient of measurement voltage divided by compensation voltage during each sampling period. The measurement voltage and the compensation voltage can be fed in accordance with this principle also into an analog-digital converter to whose output digital storages and a digital arithmetic circuit for the forming of the quotient are connected. This circuit is relatively expensive because of the means for the forming of the quotient. This is true in the case that the evaluation circuit is developed in analog technique for the forming of the quotient and, in particular, when it is developed in digital technique, since here the analog-digital converter must, first of all, convert the measurement voltage and the compensation voltage before their digital values can be further evaluated.

It is an object of the present invention to further develop a circuit of the aforementioned type in such a manner that, while being of simple construction and high precision, it is suitable to provide digital level values and, in addition, can be integrated particularly easily into a corresponding converter.

SUMMARY OF THE INVENTION

According to the invention, the resistor (10) and the capacitor (9) are parts of an integrator (operational amplifier 8) whose input can be coupled, via a first sample and hold member (4, 5) for the initial voltage $U_0$, to the resistance probe (1) and whose output is connected to a first input (13) of a comparator (14). The second input (15) of the comparator (14) can be connected, via a second sample and hold member (6, 7), directly for the heating voltage $U_1$ to the resistance probe, and means (preadjustable backward counter) for noting the time between actuation of the second sample and hold member (6, 7) and the switching of the comparator (14) are connected to an output of the comparator (14).

In accordance with this variant, the ambient temperature compensation or the normalizing of the temperature difference detected at the resistance probe between the heating voltage $U_1$ and the initial voltage $U_0$ referred to the initial voltage $U_0$ is effected by comparison of the detected heating voltage with the previously detected and then integrated initial voltage. The temperature variation of the resistance probe is in this connection compensated for by a quotient formation.

The comparator (14) which carries out this comparison can advisedly be made a part of an analog-digital converter which operates in accordance with the sawtooth method and has a presettable backward counter (17) which can be acted on by a counting frequency and be controlled by the comparator (14), which converter digitalizes, with the counting frequency, the time which elapses between the time that the integrated initial value reaches the heating voltage, on the one hand, and the start of the comparison.

The integrator can, in this connection, be constructed in inexpensive and precisely operating fashion with an operational amplifier (8) and a capacitor (9) in the feedback branch of the latter.

It is also pointed out that the precision of the principle of measurement of the first variant can be further increased by the use of a converter which operates in accordance with the dual-slope process (dual slope converter with zero-point correction).

Further according to the invention, a first input (13) of a comparator (14) can be coupled, via the first sample and hold member (4, 5) for the initial voltage ($U_0$), to the resistance probe (1), and the capacitor (7) is part of a second sample and hold member (6, 7) for the heating voltage $U_1$. The resistor (19), which discharges the heating voltage $U_1$, is connected in parallel to the capacitor (7) and means (presettable backward counter 17) for noting the time between actuation of the second sample and hold member and the switching of the comparator are connected to one output of the comparator (14).

Here a quotient formation or normalizing to the initial voltage $U_0$ takes place with the simplest means. The normalized value is detected in the case of the first variant as time between actuation of the second sample and hold member or as sampling of the heating voltage and switching of the comparator. This time can also, as in the first variant, be converted by the sawtooth process within an integrated analog-digital converter into a digital level value. The comparison between the initial voltage and the heating voltage which is sampled in time-variable manner in accordance with the resistor and the capacitor is effected here in a particularly inexpensive manner: Both of the sample and hold members as well as the resistor which discharges the capacitor of the second hold member lie directly on the inputs of the comparator which is provided for this purpose. To be sure, the time marked by switching the comparator does not in this case contain proportionally the difference, normalized to the initial voltage, between heating voltage and initial voltage but, rather, a logarithmic value of the quotient of heating voltage to initial voltage. With relatively small error in linearity, however, the logarithm of this quotient corresponds to the quotient itself. The deviation from linearity can be tolerated in many cases since the characteristic curve of the resistance probe is to be adapted to the instantaneous place of measurement, in particular an automobile gas tank.

Higher demands on the linearity can, however, also be satisfied in the second variant of the circuit by adding a quadratic member of the period of time determined on the comparator. For the linearizing of the measurement of the level, the means for detecting the time $t_{02}$ between disconnection of the second sample and hold member (6, 7) and the switching of the comparator (14) are then furthermore adapted for the additive detection of the square of the half time, in accordance with the equation $$t'_{02} = \frac{t_{02} + t_{02}^2}{2}$$

Under certain conditions which will be discussed further below, the circuit of the second variant of the invention can be further simplified in the manner that the second sample and hold member (sample switch) is eliminated and, instead of it, the capacitor (storage capacitor 7) is permanently connected, via the resistor (19), to the resistance probe (1).

Further according to the invention, a first input (15) of a comparator (14) at the capacitor (storage capacitor 21) can be coupled, both for the initial voltage $U_0$ and for the heating voltage $U_1$, at different times $t_0$ and $t_{11}$ via a first sample switch (20) to the resistance probe (1). The resistor (22) which discharges the voltage $U_0$ and $U_1$ is connected in parallel to the capacitor (storage capacitor 21). A constant reference voltage $U_{ref}$ is present on a second input (13) of the comparator (14), and the output of the comparator (14) is connected to a control input (24) of a resettable forward/backward counter (23) which can be acted on by a counting frequency. The forward/backward counter counts during the discharge (to $t_1$) of the capacitor which has been charged to the voltage $U_0$ until the reference voltage is reached in a first direction (forward) and then, during the discharge (to $t_2$) of the capacitor which has been charged to the voltage $U_1$, until reaching the reference voltage in an opposite direction (backward) forming a difference ($t_2-t_1$).

This third variant has the additional advantages that smaller requirements are made on the comparator and the sample switches, i.e. correspondingly less expensive elements can be used. In a comparator whose one input is acted on by the initial voltage discharged by a resistor-capacitor member and by the thereupon discharged heating voltage, a comparison is effected with a constant reference voltage. The comparator in this case controls a forward-backward counter which counts a counting value corresponding to the logarithm from the quotient between heating voltage and initial voltage. In the counting value there are not included variations of the reference voltage or the so-called offset voltage of the comparator if these values do not change during a measurement period.

The influence of the time constant of the resistor-capacitor member, which otherwise enters into the counting value, can further according to the invention, be advantageously eliminated. In accordance with the further development, in which the output signal for the minimum level can be set on a voltage divider (26, 27) which is fed with a fixed voltage $U_2$, a second sample switch (28) couples the capacitor (storage capacitor 21) with the minimum voltage $U_{min}$, and a third sample switch (32) couples the capacitor with the fixed higher voltage $U_2$, the forward-backward counter (23), after the formation of the difference $t_2-t_1$ and resetting during the discharge $t_3$ of the capacitor which has been charged to the voltage $U_{min}$ counts in a first direction until reaching the reference voltage $U_{ref}$ and then, during the discharge $t_4$ of the capacitor which has been charged to the voltage $U_2$ counts in an opposite direction until reaching the reference voltage forming the difference $t_4-t_3$, and the instantaneous reading of the counter can be transferred to means for the formation of the quotient (processing 33)

$$\frac{(t_2 - t_1)}{t_4 - t_3},$$

an output signal can be set for minimum level.

Due to the fact that another voltage divider (30, 31), at the fixed voltage $U_2$, can be adjusted to a warning voltage $U_W$ for the giving of a warning function, that after formation of the differences $t_2-t_1$ and $t_4-t_3$ the voltage divider (30, 31) can be acted on via a fourth sample switch (32) with the warning voltage $U_W$ for the formation of the difference ($t_4-t_5$), and that the means for the formation of the quotient (processing 33) are additionally adapted to form the quotient $$\frac{(t_4 - t_5)}{(t_4 - t_3)},$$

the circuit in the third variant can be so developed that it is suitable, in addition, to give a warning signal when a warning level is exceeded in positive or negative direction.

BRIEF DESCRIPTION OF THE DRAWINGS

With the above and other objects and advantages in view, the present invention will become more clearly understood in connection with the detailed description of preferred embodiments, when considered with the accompanying drawings, of which:

FIG. 8b are counter readings of a forward-backward counter in FIG. 6, derived from the time diagrams of FIG. 8a.

DETAILED DESCRIPTION OF THE PREFERRED EMBODIMENTS

Figure 1:
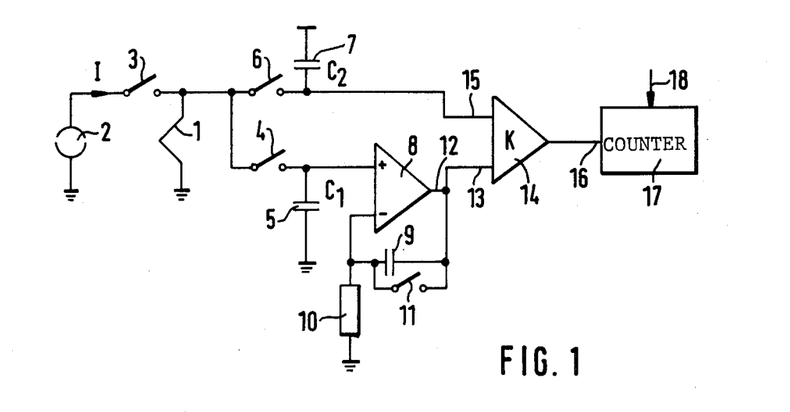
FIG. 1 is a circuit for the electrothermal measurement of level, in a first variant.

FIG. 1 shows a first variant of the evaluation circuit for the evaluation of the voltage drop produced on a resistance probe 1 for the measurement of the level. The resistance probe 1 is heated by a source of constant current 2 via a controlled switch 3 with clocked constant current. The switch 3, in the same way as other switches shown in FIG. 1 and explained below, is controlled by a program control, not shown.

To the resistance probe there are connected a first sample and hold member, consisting of a sample switch 4 and a storage capacitor 5, as well as a second sample and hold member, consisting of a sample switch 6 and a storage capacitor 7.

The first sample and hold member 4, 5 is connected to an input (+) of an integrator which consists of an operational amplifier 8, a capacitor 9 ($C_1$) in the feedback branch, and a resistor 10 ($R_1$) at a feedback input (−). In parallel to the capacitor 9 there is shown a reset switch 11.

One output 12 of the integrator is coupled to a first input 13 of a comparator 14. The second input 15 of the comparator is connected to the output of the second sample and hold member 6, 7.

The output of the comparator is connected to a control input 16 of a presettable backward counter 17 into which counting frequency pulses are fed via a counting frequency input 18. The output count of the counter 17 gives the level.

By the operation of the evaluation circuit of FIG. 1 controlled by the program control, the following processes take place periodically in measurement periods: First of all, at the start of a heating period $t_0$, the controlled switch 3 is connected, as a result of which there is the initial voltage $U_0$ on the resistance probe; see FIG. 2. This initial voltage is stored by the brief closing of the sample switch 4 in the storage capacitor 5. The capacitor 9 of the integrator is, however, initially still short-circuited so that the integration does not begin as yet. It only takes place when, shortly before the end of the heating period, at time $t_{01}$, the second sample switch 6 is briefly closed and the heating voltage $U_1$ then reached is held in the storage capacitor 7. The reset switch 11 is now opened and the voltage at the output 12 of the integrator therefore increases linearly with an increase which is proportional to the value of the output voltage $U_0$. The speed of rise or the speed of integration results in this connection from the time constant $T=R_1 \cdot C_1$.

Figure 2:
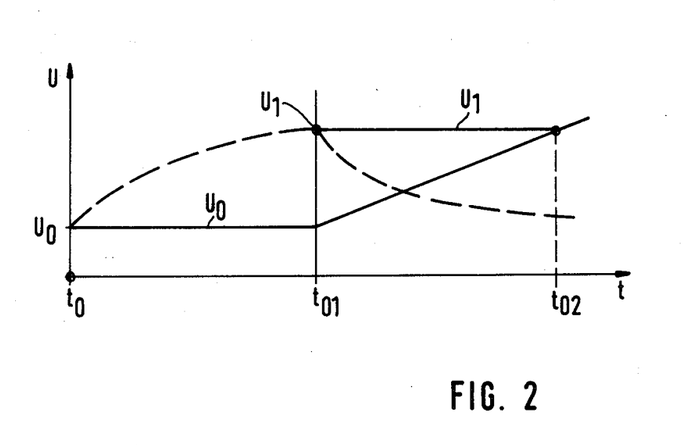
FIG. 2 are time diagrams of voltages included herein.

As from $t_{01}$ the integration continues until, at the time $t_{02}$, the integrated initial voltage is equal to the heating voltage. We then have (calculated as from $t_{01}$):

$$t = t_{02} - t_{01} = \frac{U_1 - U_0}{U_0} \cdot T = \frac{\Delta U}{U_0} \cdot T$$

This time is measured by the presettable backward counter 17 which, during the integration time, counts the number n from the counting frequency f:

$$n = A \cdot x,$$

in which $A = b \cdot T \cdot f$. Herein b is a constant factor.

It can be noted from the formula for $t_{02}$ that the temperature variation of the resistance sensor is compensated for by the quotient formation. As a further example and in addition, by integration of the above-described type with reference voltages $U'_0$, $U'_1$ and from the difference thereof $\Delta U'$ a reference voltage ratio $\Delta U'/U'_0$ can be produced, and from this a counting value $n' = c \cdot T \cdot f$, in which c once again is a constant factor. A subsequent arithmetic unit (in the same way as the reference voltage transmitter not shown in FIG. 1, see in this connection processor 33 of FIG. 6) forms the quotient $$\frac{n}{n'} = \frac{b \cdot T \cdot f}{(c \cdot T \cdot f)}$$

In this quotient $n/n'$ the influences of the time constant T and of the counting frequency f are eliminated.

If the course of the measurement is also to be controlled with the counting frequency f then a precision of <1% is required, for typical cases of use, for the counting frequency.

With respect to FIG. 2 it is furthermore pointed out that in that case the change of the voltage on the resistance probe is shown by a dashed line.

Figure 3:
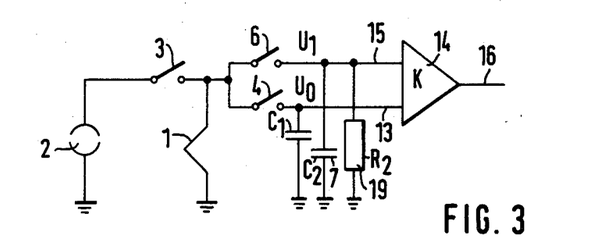
FIG. 3 shows a circuit for the electrothermal measurement of level, in a second embodiment.
Figure 5:
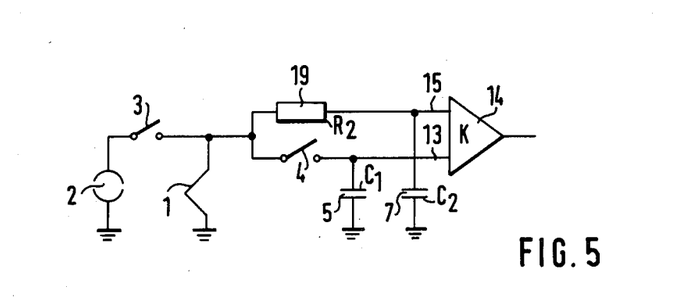
FIG. 5 is a variant of the circuit of FIG. 4.
Figure 6:
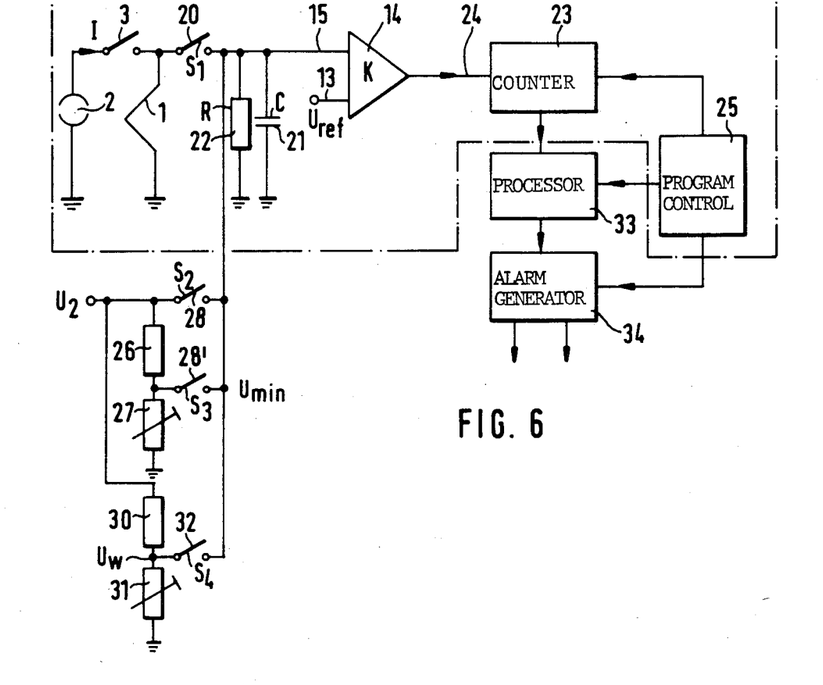
FIG. 6 shows an overall circuit for the electrothermal measurement of level, in a third variant.

In the variant evaluation circuit of FIG. 3, the same elements as in FIG. 1 have been provided with corresponding reference numbers, as is also true in FIGS. 5 and 6.

The evaluation circuit of FIG. 3 is definitely less expensive than the one shown in FIG. 1. In particular, an integrator is dispensed with. Instead of it, the first sample and hold member with the storage capacitor 5 is connected directly to the first input 13 of the comparator 14. The storage capacitor 7 of the second sample and hold member, which in the same way as in FIG. 1 is coupled directly to the second input 15 of the comparator, is in this case bypassed by a resistor $R_2$, which bears the reference number 19. The resistor 19 is thus so connected that it discharges the storage capacitor 7, doing so with the time constant $T = R_2 \cdot C_2$.

Figure 4:
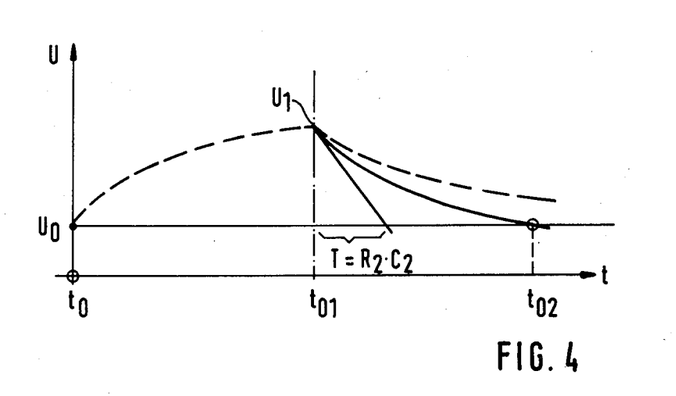
FIG. 4 are time diagrams of the voltages included in the circuit of FIG. 3.

From the corresponding time diagram in FIG. 4 it can be noted that, first of all, once again, the initial voltage $U_0$ (at the input 13) is again held and that as from the time $t_{01}$ the capacitor 7, which has been charged by brief actuation of the sample switch 6, is discharged over the resistor $R_2$ until the declining voltage on the storage capacitor 7 has become equal to the voltage on the storage capacitor 5. The discharge takes place in accordance with the time function $$U_{C2} = U_1 \cdot e^{-\frac{t}{T}}.$$

The time until this declining voltage has reached the value of the initial voltage $U_0$ is then $$t = T \cdot \ln\left(\frac{U_1}{U_0}\right).$$

By the formation of this quotient temperature compensation of the heating voltage therefore takes place here also. In addition, the influence of the time constant T, as described above, can be compensated for from the reference voltage ratio $\Delta U'/U'_0$.

With the evaluation circuit of FIG. 3, to be sure, the quotient $U_1/U_0$ is formed and not, as with the evaluation circuit of FIG. 1, $\Delta U/U_0$. Furthermore, with the evaluation circuit of FIG. 3 from the said voltage ratio the time $t_{02}$ is formed in logarithmic and not in linear dependence. However, in this connection approximately similar conditions result as in the circuit of FIG. 1, since $U_1/U_0$ can be expressed as $$\frac{(U_0 + \Delta U)}{U_0} = 1 + \frac{\Delta U}{U_0}.$$

Inserted in the above-mentioned logarithmic relationship for $t_{02}$ we then have, since $\Delta U/U_0$ is small (about 0.1), $$t \approx T \cdot \frac{\Delta U}{U_0}.$$

The deviation from linearity is in this connection less than 5%. The linearity can be improved to a value of 0.15% by the addition of a quadratic member:

$$t' = t + t^2/2$$

As mentioned, however, instead of this, the linearization can also be effected by adaptation of the characteristic curves of the resistance probe.

The evaluation circuit of FIG. 5 represents a simplification of the evaluation circuit of FIG. 3:

The resistor 19 having the value $R_2$ which effects the discharge of the voltage at the storage capacitor 7 having the value $C_2$ is in this case not connected in parallel to the storage capacitor 7 but is inserted in the circuit in the place of the sample switch 5.

Thus the storage capacitor 7 is discharged over the resistor 19 and the resistance probe 1 as from the time $t_{01}$ when the constant current is connected by the controlled switch 3. Conversely, prior to this the charging of the storage capacitor 7 takes place also via the resistor 12, as a result of which higher-frequency disturbances can be suppressed.

In the circuit of FIG. 5, the following conditions are established as compared with FIG. 3: The resistance $R_2$ of the resistor 7 is substantially greater than that of the resistance probe, for instance $R_2 = 100$ k ohms as compared with the probe resistance of about 15 ohms. The disconnected source of constant current does not produce any substantial residual current which leads to an offset voltage on the probe.

The lead wires to the measurement probe are relatively short in order not to take up any large disturbances.

The time constant T is small as compared with the time constant with which the temperature at the resistance probe varies.

The above-indicated condition for the time constant T can be satisfied by selection of the storage capacitor 7 with the value $C_2 = 100$ nF for the said resistance of $R_2$.

Furthermore, in both the evaluation circuits of FIGS. 3 and 5 the following additional requirements must be satisfied for precise measurements:

1. The offset voltage of the comparator 14 must be small;
2. The residual currents, particularly over the sample switch 4, must be very small.

In the circuit of FIG. 6 (part bordered by dashed line) the first additional requirement, on the other hand, is done away with and the second additional requirement is less demanding:

In the circuit of FIG. 6 only a single sample and hold member is present, with the sample switch 20 and the storage capacitor 21. It has the capacitance C. A resistor 22 with the resistance R is connected in parallel to the storage capacitor. This sample and hold member lies at the second input 15 of the comparator 14 whose first input 13 is acted on by a constant reference voltage $U_{ref}$. The output of the comparator 14 controls a presettable backward-forward counter 23 via a control input 24; the forward-backward counter 23 is connected for resetting with a program control 25 which also controls the sample switch 20 and the controlled switch 3.

The function of the part of the circuit described up to now will be explained, first of all, with reference to FIG. 7, time curves I and $S_1$, as well as with reference to FIGS. 8a and 8b:

Upon the connecting of the constant current by the switch 3, the initial voltage $U_0$ is first of all stored in the storage capacitor 21, the sample switch 20 or $S_1$ being briefly actuated as from the time $t_0$. Thereupon the storage capacitor 21 discharges over the resistor 22 with a time constant $T = R \cdot C$ until the capacitor voltage at the input 15 reaches the value of the reference voltage $U_{ref}$ at the input 13 of the comparator 14. This takes place at the time $t_1$; see FIG. 8a. We then have:

$$t_1 = T \cdot \ln\frac{U_0}{U_{ref}}$$

Figure 7:
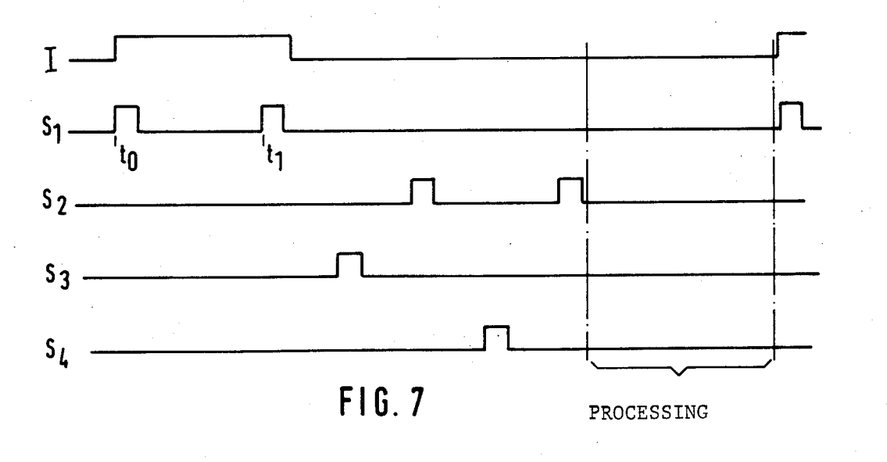
FIG. 7 are time diagrams of switch positions in the circuit of FIG. 6.
Figure 8A:
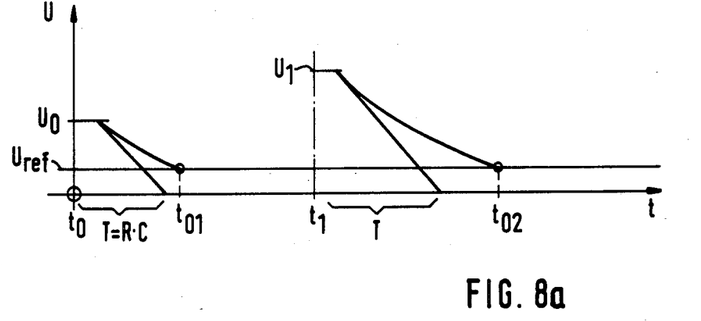
FIG. 8a are time-variable voltages included in the circuit of FIG. 6.
Figure 8B:
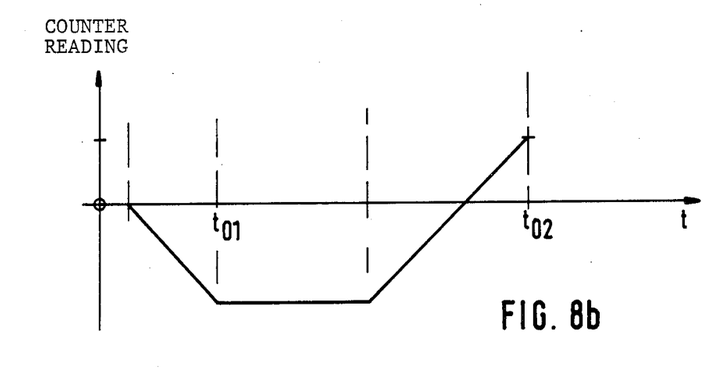

This time is recorded as numerical value in the forward-backward counter 23 which was first reset to zero and in this phase counts backward, controlled by the program control 25; see FIG. 8b. Shortly before the constant current is disconnected by the switch 3, a similar process takes place for the heating voltage $U_1$ then reached by renewed brief actuation of the sample switch 20 or $S_1$ at the time $t_1$ (see FIG. 7). Thereupon, the storage capacitor 21 again discharges in accordance with the known time function over the resistor 22 until the reference voltage is reached. In this way the time is formed $$t_2 = T \ln \frac{U_1}{U_{ref}}$$

During this discharge, however, the forward-backward counter 23 counts forwards, controlled by the program control 25. Thus there is now present in the forward-backward counter 23 a number equal to the difference $$t_2 - t_1 = T \cdot \left( \ln \frac{U_1}{U_{ref}} - \ln \frac{U_0}{U_{ref}} \right)$$

$$t_2 - t_1 = T \cdot \ln \frac{U_1}{U_0}.$$

It is clear from this that the influence of the reference voltage is eliminated, as well as that of an offset voltage by which the reference voltage is greater or smaller if said voltages do not change during the measurement time of about 2 seconds.

In order to compensate for the influence of the time constants $T=R\cdot C$, a reference voltage ratio can be formed in the manner already indicated, namely as time difference $t_4-t_3$ analogous to the time difference $t_2-t_1$ described above.

For this, the circuit part fed with the voltage $U_2$ is provided in FIG. 6. This is a voltage divider with the divider resistor 26 and the settable divider resistor 27. The voltage $U_{min}$ can be tapped off at the common junction point between the two divider resistors. The sampling of the voltage $U_2$ is effected with a sample switch 28 or $S_2$.

The voltage $U_{min}$ is sampled by the sample switch 28' or $S_3$. The switches are actuated by the program control 25 after the switches 3 and $S_1$; see pulse diagram FIG. 7. By the discharge of the capacitor 21 until the reference voltage $U_{ref}$ is reached there then result the following $$t_4 = T \ln \frac{U_2}{U_{ref}}$$

$$t_3 = T \ln \frac{U_{min}}{U_{ref}}$$

From this there follows, as difference and corresponding counting value of the forward-backward counter 23:

$$t_4 - t_3 = T \ln \frac{U_2}{U_{min}}$$

Thereupon the following quotient can be formed in the "processing" circuit part bearing the reference number 33 in FIG. 6, program controlled:

$$\frac{t_2 - t_1}{t_4 - t_3} = \frac{\ln \frac{U_1}{U_0}}{\ln \frac{U_2}{U_{min}}}$$

Thus the influence of T drops out and the output signal for the minimum level of filling can be set.

In order to form an alarm signal when a warning level is exceeded in positive or negative direction, another variable can then be formed. For this purpose there is employed another voltage divider, which in FIG. 6 by means of the fixed divider resistor 30 and the adjustable divider resistor 31, forms from the voltage $U_2$ the voltage $U_W$ which can be sampled by a sample switch 32 or $S_4$ and charges the storage capacitor 21. By the charging and discharging of the storage capacitor, by detection of equality of voltage with the reference voltage at the comparator and by corresponding backward and forward counting and formation of quotient similar to the processes described above, the following relationship is finally formed, which signals the exceeding in positive or negative direction of a warning level:

$$\frac{(t_4 - t_5)}{(t_4 - t_3)} = \frac{\ln\left(\frac{U_2}{U_W}\right)}{\ln\left(\frac{U_2}{U_{min}}\right)}.$$

By the normalizing to ln $U_2/U_{min}$, the warning level does not change if the output signal for the minimum level of filling is balanced out.

With respect to the pulse diagram of FIG. 7 it should furthermore be explained that in the "processing" time span the following processes take place in a function block 33 aside from the above-mentioned normalization by quotient formation: Linearization of characteristic curves and sliding mean value formation. An arithmetic unit or processor 33 controls a generator 34 with output signal generators for level-proportional signals such as frequency, scanning ratio, current or voltage by means of a digital-analog converter. Furthermore, the output signal generator forms level alarm signals, for instance as reserve warning in automotive vehicles.

Legends of figures:

FIG. 6:
23—Backward-and-forward counter
25—Program control
33—Processing
34—Output signal production
FIG. 8b:
A=Counter reading
I claim:
1. In a circuit for electrothermal measurement of the level of a liquid within a container with compensation for ambient temperature, which circuit has a switchable source of constant current for energizing a resistance probe, a comparator which compares an initial voltage $V_0$ appearing at the resistance probe at the start of a heating period with a heating voltage $V_1$ appearing at the end of a heating period, an improvement providing the measurement by a counting operation, the improvement comprising
- an integrator comprising a resistor and a capacitor connected together in an integrating circuit,
- a counter, said comparator having a first input terminal connected to an output terminal of said integrator, and an output terminal providing a control signal coupled to said counter for starting and stopping a counting of said counter; and
- a plurality of sample-and-hold circuits connected to said probe for sampling voltage developed thereat in response to the application of current to the probe by the current source, a first of said sample-and-hold circuits being connected to an input terminal of said integrator for applying thereto a sample of voltage $V_0$ at the beginning of a heating interval, and a second of said sample-and-hold circuits being connected to a second input terminal of said integrator, for applying thereto a sample of voltage $V_1$ at the end of the heating interval; and wherein
- said counter begins counting backward upon actuation of said comparator by a signal of said second sample-and-hold circuit, and terminates counting upon actuation of said comparator by an output signal of said integrator.

2. The electrothermal measurement circuit according to claim 1, wherein
the integrator is formed with an operational amplifier, and a capacitor is connected in the feedback branch of the operational amplifier.

3. The electrothermal measurement circuit according to claim 1, wherein
said comparator in combination with said integrator and said counter function as an analog-digital converter which operates in accordance with the sawtooth method, the counter being responsive to clock pulses at a predetermined counting frequency.

4. In a circuit for electrothermal measurement of the level of a liquid within a container with compensation for ambient temperature, which circuit has a switchable source of constant current for energizing a resistance probe, a comparator which compares an initial voltage $V_0$ appearing at the resistance probe at the start of a heating period with a heating voltage $V_1$ appearing at the end of a heating period, an improvement providing the measurement by a counting operation, the improvement comprising
- a counter, said comparator having an output terminal coupled to an input terminal of said counter and providing thereto a control signal for starting and stopping a counting of said counter;
- a plurality of sample-and-hold circuits connected to said probe for sampling voltage developed thereat in response to the application of current to the probe by the current source, a first of said sample-and-hold circuits being connected to an input terminal of said comparator for applying thereto a sample of voltage $V_0$ at the beginning of a heating interval;
- a second of said sample-and-hold circuits comprising a switch, and a resistor and a capacitor connected thereto, said resistor and said capacitor being further connected together to form an integrator, said second of said sample-and-hold circuits being connected to a second input terminal of said comparator for applying thereto a sample of voltage $V_1$ at the end of the heating interval; and wherein
- said counter begins counting backward upon actuation of said comparator by a signal of said second sample-and-hold circuit, and terminates counting upon actuation of said comparator by an output signal of said integrator; and wherein
- said resistor and said capacitor are connected in parallel, said resistor discharging said capacitor subsequent to an opening of said switch to provide an integration waveform.

5. The electrothermal measurement circuit according to claim 4, wherein
for the linearizing of the measurement of the level, the improvement further comprising arithmetic means responsive to a time $t_2$ between disconnection of the switch of said second sample-and-hold circuit and a switching of an output signal state of said comparator for processing the equation $$t'_{02} = \frac{t_{02} + t_{02}^2/2}{2},$$

thereby to linearize a count of said counter.

6. In a circuit for electrothermal measurement of the level of a liquid within a container with compensation for ambient temperature, which circuit has a switchable source of constant current for energizing a resistance probe, a comparator which compares an initial voltage $V_0$ appearing at the resistance probe at the start of a heating period with a heating voltage $V_1$ appearing at the end of a heating period, an improvement providing the measurement by a counting operation, the improvement comprising
- a counter, said comparator having an output terminal coupled to an input terminal of said counter and providing thereto a control signal for starting and stopping a counting of said counter;
- a sample-and-hold circuit connected to a first input terminal of said comparator for applying thereto a sample of voltage $V_0$ at the beginning of a heating interval; and
- a resistor and a capacitor connected together to form an integrator, an output terminal of said integrator being connected to a second input terminal of said comparator, said resistor connecting said capacitor to said probe to provide an output signal of said integrator to said comparator having waveforms which are the integral of the voltage at the probe both before and after termination of probe current from the current source.

7. In a circuit for electrothermal measurement of the level of a liquid within a container with compensation for ambient temperature, which circuit has a switchable source of constant current for energizing a resistance probe, a comparator which compares an initial voltage $V_0$ appearing at the resistance probe at the start of a heating period with a heating voltage $V_1$ appearing at the end of a heating period, an improvement providing the measurement by a counting operation, the improvement comprising
- a counter, said comparator having an output terminal coupled to an input terminal of said counter and providing thereto a control signal for starting and stopping a counting of said counter, a fixed reference voltage being applied to a first input terminal of said comparator;

a sampling switch;

a resistor and a capacitor connected together to form an integrator, an output terminal of said integrator being connected to a second input terminal of said comparator, said resistor and said capacitor being connected in parallel, said resistor discharging said capacitor subsequent to an opening of said switch to provide an integration waveform; and wherein said sampling switch connects a junction of said comparator and said integrator to said probe both for the initial voltage $V_0$ and for the heating voltage $V_1$ at their respective times of occurrence, said comparator output signal activating said counter to count in a forward direction during a discharge of said capacitor until equality is reached between voltage across the capacitor and the fixed reference voltage, there being counting in the backward direction during discharge of the capacitor from a heating voltage $V_1$ until equality between the capacitor voltage and the fixed reference voltage.

8. The electrothermal measurement circuit according to claim 7, further comprising a voltage divider which is fed with a fixed voltage $V_2$ to provide a further reference signal for a minimum liquid level;

a second sample switch which supplies the capacitor with a minimum voltage $V_{min}$, and a third sample switch which supplies the capacitor with a fixed higher voltage; and wherein the counter, after a time difference $t_{12}-t_{01}$ and a resetting during a discharge time $t_3$ of the capacitor which has been charged to the voltage $V_{min}$, counts in a first direction until reaching the reference voltage $V_{ref}$ and then, during the discharge $t_4$ of the capacitor which has been charged to the voltage $V_2$ counts in an opposite direction until reaching the reference voltage forming a difference $t_4-t_3$;

the improvement further comprising an arithmetic means, wherein the instantaneous reading of the counter is transferred for the formation of the quotient $$\frac{(t_2 - t_1)}{(t_4 - t_3)}$$

for providing a measure of the liquid level.

9. The electrothermal measurement circuit according to claim 8, further comprising an additional sampling switch and another voltage divider at the fixed voltage $V_2$ which can adjust the voltage to a warning voltage $V_W$ for the giving of a warning function, and that after a formation of the difference $t_2-t_1$ and $t_4-t_3$ by the arithmetic unit, said another voltage divider can be acted on via said additional sample switch with the warning voltage $V_W$ for the formation of the difference $(t_5-t_3)$, and that said arithmetic means for the formation of the quotient is additionally adapted to form the quotient $$\frac{(t_4 - t_5)}{(t_4 - t_3)}$$

for providing a measure of the liquid level.

* * * * *